Feb. 9, 1943.  L. D. SOUBIER  2,310,715
METHOD OF AND APPARATUS FOR FEEDING GLASS
Filed May 4, 1940   2 Sheets-Sheet 1
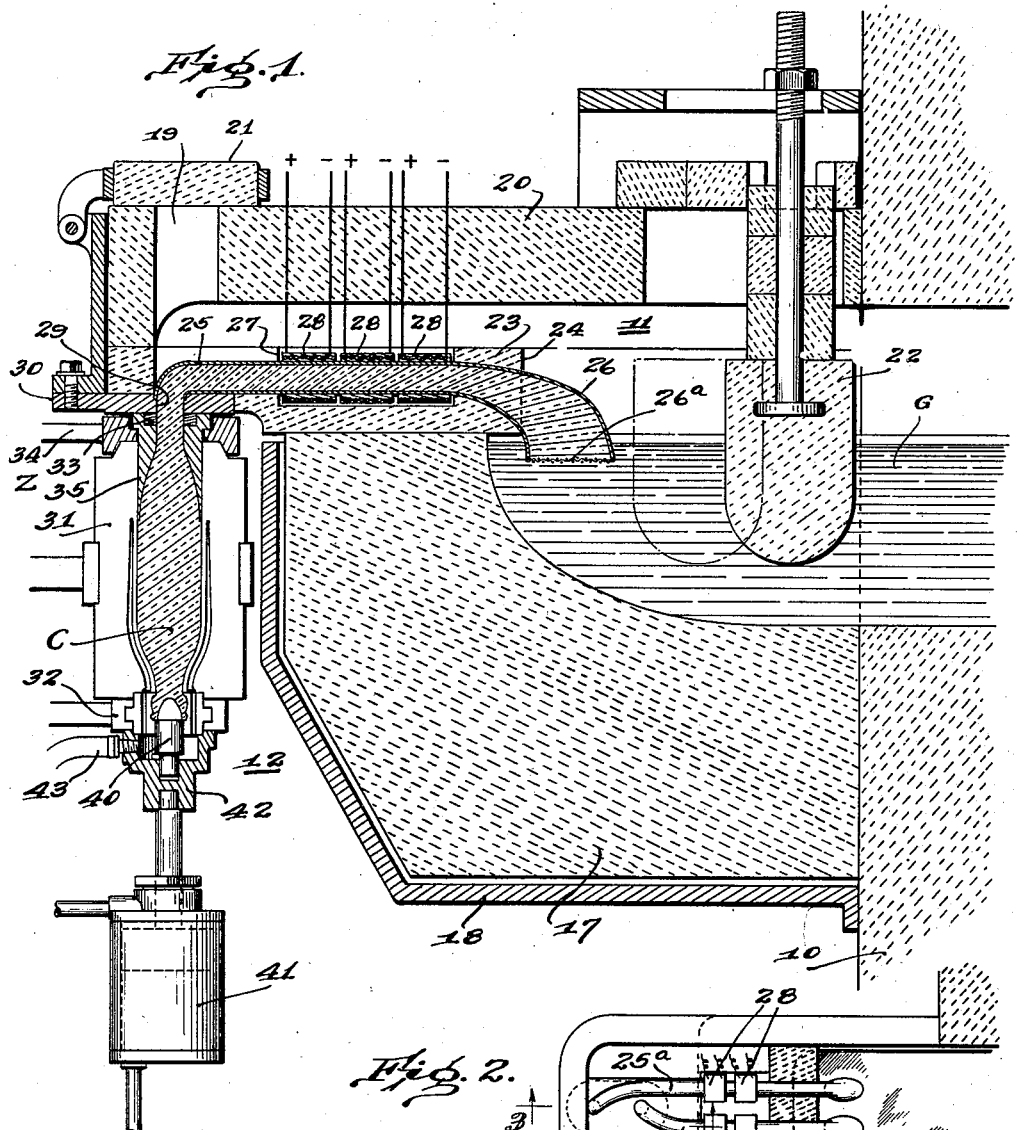
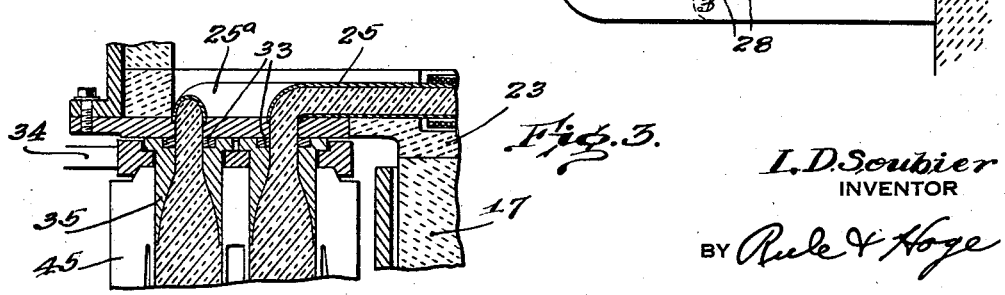
L. D. Soubier
INVENTOR
BY Rule & Hoge
ATTORNEYS Feb. 9, 1943.   L. D. SOUBIER   2,310,715
METHOD OF AND APPARATUS FOR FEEDING GLASS
Filed May 4, 1940   2 Sheets-Sheet 2
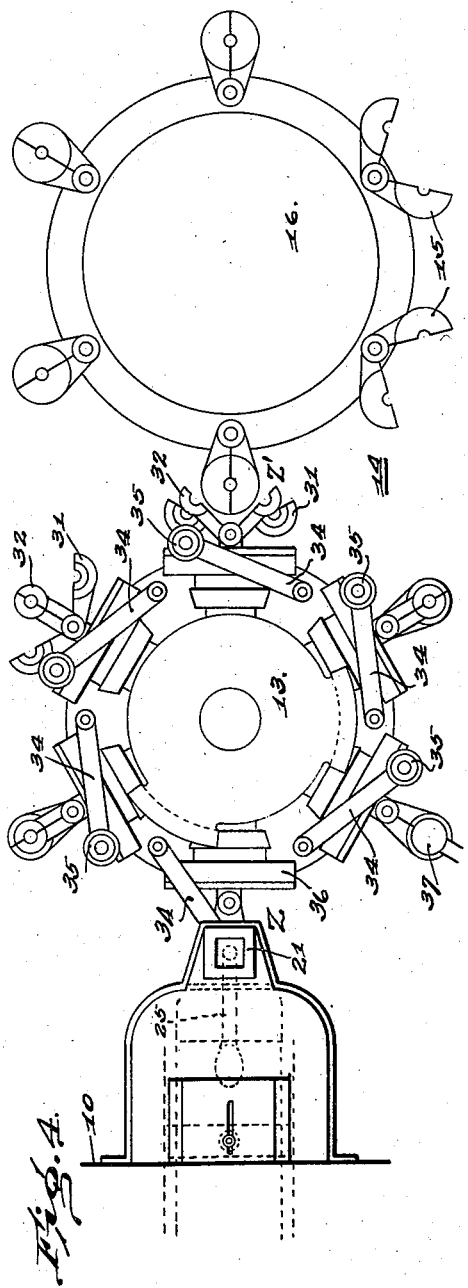
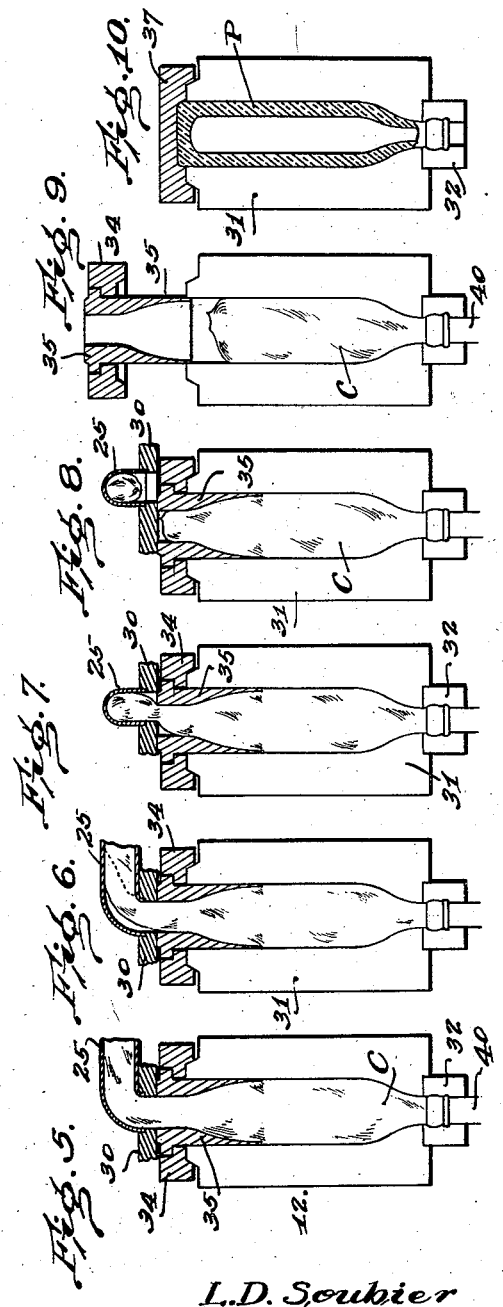
L. D. Soubier
INVENTOR
BY
ATTORNEYS Patented Feb. 9, 1943

2,310,715

UNITED STATES PATENT OFFICE 2,310,715

METHOD OF AND APPARATUS FOR FEEDING GLASS

Leonard D. Soubier, Toledo, Ohio, assignor to Owens-Illinois Glass Company, a corporation of Ohio Application May 4, 1940, Serial No. 333,347

10 Claims. (Cl. 49—5)

The present invention relates to a method of and an apparatus for feeding glass. More specifically, the invention relates to a method and apparatus for withdrawing molten glass from the forehearth of a refining furnace; delivering the glass to a series of parison molds incorporated in a glassware forming machine; and shearing the delivered charges from the supply body.

Among the various objects to be fulfilled by the present method and apparatus is the production of as free and unrestricted forced withdrawal of molten glass through a flow conduit as is practical, that is, a flow in which the skin frictional resistance of the superimposed mass of glass in contact with the walls of the flow conduit leading from the furnace forehearth is to a great extent eliminated.

Another object of the invention is to produce what might be termed a forced and measured volume withdrawal of molten glass from the furnace forehearth, the withdrawn glass being substantially cylindrical in form, or having a cross-section approximately similar to the cross-section of the flow conduit and of the parison mold as it leaves the former and enters the latter. In usual practice the flow of glass from a flow opening is a rapidly converging one that becomes string-like a short distance fom the flow opening, thus necessitating an accumulative gathering of glass to fill the parison mold and consequently producing a slow filling resulting in uneven congealing during the gather. By the improved forced and measured volume withdrawal of glass, the parison molds may be filled almost simultaneously. In other words, the acceleration of the volume flow by an impulse agency, which in the present instance is a vacuum withdrawal, causes a downward impetus or thrusting current within the glass toward the parison molds in the line of normal gravity flow producing substantially instantaneous filling of the molds.

Another and closely related object of the invention is to modify the volume flow as it enters the parison molds in a manner to completely fill the mold and produce a substantially uniform plastic charge by making effective a suctional action that operates firstly to eliminate the resistance which confined air would offer to the glass flowing into the mold and, secondly, to render effective the combination of forces acting on the glass, namely, suction and gravity, so that an envelope of glass will be drawn into contact with the mold walls similar to the blowing of glass with air but in which a nucleus of glass itself is the distending agency and the mold will be filled completely with glass instead of with air and glass.

Another object of the invention is to so portion off the glass after it has filled the parison mold that any congealing effect attending the severing action will not be transferred back into the forehearth. In prior art methods, when a charge is withdrawn from the supply body by gravity in a continuous stream, the means employed to cut the stream have frequently been used to retard and hold the oncoming portion of the stream above the point of severance. In any such severing action in which a surface of some kind wipes over the glass at the flow opening and closes the opening, the severing means absorbs heat from the glass, resulting in a partial cooling of the glass in the flow opening and making the same unfit for subsequent formative use. Furthermore, as soon as the severing means is retracted and the support removed from under the glass depending through the opening, the glass at once resumes its downward movement due to the force of gravity, allowing insufficient time for the removal of the charged mold and the substitution of an empty mold before the severing operation must be repeated.

Another prior art method sometimes employed for holding and retarding the oncoming portion of the stream above the point of severance is to supply a blast of compressed air of sufficient force to overcome the inertia of the glass and start it moving upwardly and inwardly of the discharge port. Experience has shown, however, that the resistance of the glass diminishes as it travels so that a blast of air sufficient to start the glass moving will cause the rate of travel of the glass to increase until the glass is shot back into the forehearth, thus forming air bubbles that linger in the vicinity of the discharge opening and are admitted to the succeeding mold at the next charging operation. The net result is that the next severed blank will contain bubbles and streaks rendering the product when blown or pressed imperfect. Additionally, the mechanism employed for producing such a blast of air is complicated, involving as it does costly valves and other fittings.

Yet another method frequently employed for restricting or retarding the flow of glass from the discharge opening during substitution of molds beneath the same is the use of a plug or plunger (which may or may not be artificially cooled) which is disposed within the forehearth and extends downwardly through the glass into the region of the discharge opening. The plunger is reciprocated vertically in such a manner that immediately after the shear, the plunger is raised and the glass in the vicinity of the discharge opening which has a tendency to adhere to the plunger is drawn upwardly and its flow from the discharge opening is thus momentarily restricted or suspended until another mold has moved into position beneath the opening. With this method of restricting glass flow during substitution of molds below the discharge opening, difficulty has been encountered (in the case of artificially chilled plungers) in the streaking of chilled glass adhering to the plunger through the discharge opening and into the mold. In the case of the non-chilled plungers, the material of the plunger is frequently burned away and similarly streaks through the discharge opening.

It will be noted that in the various methods hereinabove described for controlling the flow of glass through an outlet, some artificial means has been utilized to counteract the action of gravity upon the glass at the opening in order to make possible a commercial operation.

The present invention is designed to overcome all of the above mentioned limitations that are attendant upon the use of such artificial hold-back devices by providing a flow conduit leading from the forehearth to the molds in which the weight of a predetermined portion of each succeeding charge-forming body of glass is utilized to draw any chilled glass existing by virtue of the severing operation back into the flow conduit through the action of the gravitational forces acting thereon where it is reheated before delivery to the succeeding mold or molds. In this way stagnation in the flow conduit of glass intended for subsequent mold charging operations is prevented and a constantly available fresh supply of glass in a molten or liquid state is available for feeding successively positioned parison or other molds to be filled.

In thus carrying out the invention, beginning with molten glass in the forehearth, glass is led to a suitable conduit, preferably one that is funnel-shaped and that extends upwardly over a forward wall or lip of the forehearth and downwardly in siphon-like fashion and terminates in a discharge opening above the molds to be filled at a charging zone. In order to reduce the skin friction and keep the flow conduit free from chilled glass, electrical heating elements are passed around the flow conduit to superheat the walls thereof in such a manner and to such a degree that the glass in contact with the walls of the flow conduit becomes more liquid and acts as a lubricant, thus eliminating the ordinary causes of flow restriction and obtaining a potentially free rapid flow which will cause the glass to issue from the discharge opening in a mass approximating the shape of the parison mold cavity to which the glass is delivered.

Having thus produced a comparatively thick mass of glass of desired shape in the immediate vicinity of the discharge opening of the flow conduit, and having maintained a superheated atmosphere about this mass of glass to prevent chilling thereof, a parison mold or other mold is brought into register with the discharge opening of the flow conduit and suction is applied within the mold. The effect of such suction is not only to eliminate air from the cavity but also to supplement the force of gravity in producing a rapid inflow of glass and causing it to quickly fill the mold. In this filling operation a nucleus of glass instead of air is the medium by which the glass is expanded into contact with the walls of the mold. The almost instantaneous filling of the mold in such a manner results in a substantially simultaneous contact of the glass with the entire surface area of the mold cavity so that any surface congealing will be uniform and conducive toward proper preparation of the parison for subsequent formative purposes.

Immediately after filling of the mold, the glass connecting the charge in the mold with the supply body is severed above the level of the glass within the supply body in the forehearth by relative movement of the mold across the discharge opening or by any of the well known conventional shears. Because of the fact that the severing operation takes place above the level of glass within the forehearth, upon exposure of the discharge opening to the atmosphere after the mold and charge therein have moved from the vicinity thereof, the exposed end of the glass column existing within the flow conduit is drawn upwardly within the conduit by a bodily shifting of the mass of glass in the conduit inwardly toward the forehearth by a gravitational action in which the weight of the glass column at the inner end of the flow conduit is the reverse impelling force. Because of and depending on the rapidity with which the next succeeding mold is brought into charging position beneath the discharge opening of the flow conduit and suction applied thereto, and depending upon the weight and viscosity of the glass in the inner end of the flow conduit, the gravitational action is not carried to completion between each mold charging. The flow conduit, instead of being drained or emptied by such action, retains the major portion of the glass contained therein and the net effect of this is merely a momentary reverse of the direction of movement of the glass contained in the conduit with the effect of suspending the flow in between the times of filling successive molds.

The above described method can be carried out for a given set of conditions in an apparatus such as that herein described and illustrated. Another set of conditions can be complied with merely by varying the character of the flow conduit so that its effective flow action is altered either to increase or to decrease the reverse impulse on the glass therein and accordingly vary the return or reverse flow or shifting of the glass during substitution of molds below the discharge opening. In practice, it may be desired that a certain and appreciable amount of reverse impulse be applied to the glass within the conduit in order that the chill imparted by the severing operation may be nullified by the superheating of the flow conduit. Such reverse impulse, however, should not be so great as to drain or empty the flow conduit of all of its contents, a small reverse shifting of the glass in the conduit being desirable for most efficient control.

The volume of glass contained within the mold and the flow conduit at any given moment, whether during the gathering operation or during the interim in which the reverse flow takes place, is completely sealed from the atmosphere and this is conducive toward maintaining the glass in a highly plastic state and avoiding surface chill.

In the accompanying drawings:

Fig. 1 is a vertical sectional view taken through a furnace forehearth to which the improved feeding apparatus has been applied and showing the same operatively associated in charging relation to one of the parison molds of a forming machine;

Fig. 2 is a plan view of a modification showing a multiple feeding conduit;

Fig. 3 is a sectional view at line 3—3 on Fig. 2;

Fig. 4 is a top plan view of the feeding apparatus and forming machine, the latter being illustrated more or less diagrammatically; and Figs. 5 to 10, inclusive, are diagrammatic views of a mold structure and flow conduit employed in connection with the present invention, illustrating the manner in which the shearing operation is effected.

In the drawings, a furnace 10 is provided with a forehearth 11 from which molten glass G is adapted to be periodically withdrawn and severed into charges C which are delivered at a charging zone Z to a series of inverted parison forming units 12 carried by the parison table 13 of a forming machine 14. The charges C received in the inverted parison forming units at the charging zone Z are shaped into parisons P (Fig. 10) and are uprighted and delivered at a transfer zone Z' to the forming molds 15 on the blow table 16 of the forming machine 14 in which forming molds the parisons are blown to final shape. In the drawings the forming machine 14 has been illustrated more or less diagrammatically as its specific construction, except insofar as the charging operations at the charging zone Z are concerned, is conventional and forms no part of the present invention.

The forehearth 11 includes a basin 17 constructed of suitable refractory material enclosed in a metal casing 18 supported from the furnace 10. A stack 19 is formed in the bridge wall 20 of the forehearth and is provided with a damper 21 by means of which the flow of furnace gases across the surface of the glass G and upwardly through the stack may be regulated.

A dividing wall 22 of refractory material extends across the forehearth and is adjustable vertically and horizontally toward and away from the front wall of the forehearth to assist in regulating the temperature of glass maintained in that portion of the forehearth from which glass is withdrawn for formative purposes.

Supported on the front wall of the forehearth in the vicinity of the mold charging zone Z is a refractory block 23 having an enlarged portion 24 at its rear or inner end through which there extends a flow conduit 25 and through which molten glass is periodically withdrawn and supplied to the parison forming units 12. In order to withstand the extremely high temperatures encountered, the flow conduit may be formed of a platinum-iridium or other platinum alloy. The conduit 25 is flared or enlarged outwardly at its inner or rear end as at 26, extending downwardly below the level of the glass G in the forehearth and having a platinum alloy screen 26$^a$ over its inner opening to prevent stones, etc. from entering the conduit. The forward portion of the conduit 25 is supported on the block 23. A recess 27 formed medially in the block 23 leaves the medial regions of the conduit 25 spaced from the block in order that electrical heating elements 28 may be passed therearound to superheat the glass passing through the conduit. The heating elements 28 may be so arranged that the electric current flowing through any one or all may be turned off and on at will in order that any desired combination of elements 28 may be utilized to obtain the most desirable temperature regulation and control of the glass as it passes through the conduit 25. It is also contemplated that the conduit 25 may be so constructed and wired that it may act as its own heating element when energized. The extreme forward end of the flow conduit 25 is turned downwardly and registers with a discharge opening 29 provided in a horizontal shear plate 30 bolted or otherwise secured to the casing 18. The height of the lower end of the opening 29 is above the level of glass G contained within the forehearth 11 for a purpose that will appear hereinafter.

Returning now to the forming machine 14, means is provided for periodically indexing the parison table 13 and blow table 16 in unison whereupon the parison mold units 12 are moved in step-by-step fashion through the charging and transfer zones Z and Z' respectively. Each parison forming unit 12 includes partible parison body mold sections 31 and partible neck mold sections 32 which cooperate with each other in closed relationship at the charging zone Z to form an inverted parison forming unit, the upper end of which is open and in register with the discharge-opening 29 in the shear plate 30 for the reception of mold charges in the cavity of the parison forming unit. The inverted parison forming unit is designed for cooperation with a ring-like adapter and shear unit 33 which is mounted on a horizontal swinging arm 34 pivoted to the carriage and also vertically movable in such a manner that the adapter may be elevated above the level of the upper end of the inverted body parison mold and then lowered into sealing register therewith. A portion 35 of the adapter 33 is adapted to project into the body parison mold cavity when the parts are in register at the charging zone Z.

Each pair of body parison and neck mold sections 31 and 32 which cooperate with each other to make up an individual parison forming unit 12, is carried by a drum member 36, means being provided for inverting the drum member and retaining the same in both inverted and reverted positions. In the reverted position of the drum member 36, the parison forming units 12 are adapted to be opened to permit transfer of the formed parisons to the finishing molds 15 on the blow table.

A conventional plunger 40, actuated by a piston motor 41, effects an initial blow opening in the lower end or neck portion of the charge C after the same is received in the parison forming unit 12. The plunger 40 is mounted within a suction head 42 having a connection 43 for application of vacuum to the parison forming unit 12 to draw a charge of glass thereinto in a manner presently to be set forth.

During movement of the parison forming units 12 from the charging zone Z to the transfer zone Z', the adapter 33 is elevated from register with the upper end of the closed inverted body parison mold by any suitable means, such as a stationary cam (not shown), and swung to an inoperative position. A compression plate 37 is then brought into register and sealing engagement with the upper end of the inverted mold and a blow head (not shown) is brought into register with the neck mold to effect expansion of the charge to the form of the completed parison P.

As previously stated, the illustration of the conventional forming machine 14 in the drawings is more or less diagrammatic. A full disclosure of a similar machine may be had by reference to the patent to Lynch et al., 1,787,635, dated January 6, 1931, for an Apparatus for feeding and forming glass. The present invention is concerned primarily with the method and apparatus by means of which measured charges C of glass are delivered to such a machine and not with the manner in which these charges are ultimately shaped to final form. In other words, the mold structure for receiving the charges of glass drawn from the flow conduit 25 may be of any suitable design and may be associated with any suitable forming machine providing, of course, adequate means is provided for applying vacuum to the mold cavity at the proper instant.

In the operation of the apparatus, as each parison forming unit 12 approaches the charging zone Z, the adapter 33 is lowered into register with the upper end of the closed parison mold sections 31 in the manner previously described. As the unit 12 moves into the charging zone, the upper surface of the adapter 33 moves beneath the shear plate 30 and the opening extending through the adapter comes into sealing register with the opening 29 in the shear plate. In this manner, as each set of mold sections 31 is brought into registry with the opening 29, they form a continuation of the conduit 25 and together create a complete glass conveying and charge segregating unit. The unit 12 being held stationary in between consecutive indexing operations of the parison table 13, suction is applied through the conduit 43 to vacuumize the mold cavity of the parison forming unit 12 whereupon a charge of molten glass is drawn into and fills the mold cavity and also the cavity in the adapter 33. Such withdrawal of glass from the flow conduit causes a volume flow therein, the glass leaving through the discharge opening 29 downwardly, and entering through the other end of the flow conduit upwardly from the supply body contained within the furnace forehearth. Such volume flow within the conduit 25 may be facilitated by an increase in the fluidity of the glass within the conduit, especially in the outer surface regions thereof, where a lubricating effect is obtained as previously described due to the superheating of the conduit walls both by circulation of hot furnace gases therearound and to the radiation of heat generated by the electrical heating elements 28.

As the glass is drawn from the discharge opening 29 it immediately assumes the shape of the mold cavity. The movement of glass into the mold is instantaneous and since the body of glass has been highly superheated and in addition has been completely sealed from the atmosphere during its travel through the flow conduit 25, the glass is free from chill and also from imprisoned air. The mold cavity is rapidly filled with thoroughly heated unchilled glass and the desired swelling effect is obtained in which it expands upon entering the mold cavity in a manner similar to that obtained in blowing glass but in which the forcing fluid is the differential pressure obtained by applying vacuum through the mold 12. The mass of glass contacts the entire surface area of the mold cavity walls so that any surface congealing is uniform and the parison thus formed is suitable for subsequent formative purposes.

Immediately after filling of the mold cavity, the parison table 13 is indexed and the parison forming unit 12, filled with glass, moves away from the charging station S. Such movement is illustrated diagrammatically in Figs. 5 to 9 inclusive.

After such filling of the mold cavity, the supply of vacuum to the same is terminated, due to such filling and the inability of the mold cavity to receive additional glass. The parison forming unit 12, adapter 33 and shear plate 30 thus assume the relation diagrammatically illustrated in Fig. 5. Upon filling of the mold cavity with glass, the table 13 is indexed, causing the action diagrammatically illustrated in Figs. 6, 7 and 8 to take place which is, in effect, removing a section of the conduit, the result of which is that there no longer exists a condition wherein the vacuum is effective. The discontinuing of the vacuum allows the weight of glass in section 26 of the conduit 25 to seek its normal level in the forebay, thus causing a reverse movement of the glass in the conduit 25, and draws the glass in the vicinity of the discharge opening 29 away from the opening. As the parison table 13 is indexed, the adapter 33 and shear plate 30 effect a shearing action on the glass as shown in Fig. 7. In Fig. 8 the shear has been completed and the discharge opening 29 has been exposed to atmosphere, allowing the full action of the reverse impulse to take place. The exposed end of the glass column existing within the flow conduit 25 is thus drawn upwardly into the conduit by a bodily shifting of the mass in the conduit inwardly toward the forehearth. The weight of the column of glass existing in the flow conduit 25 at the inner end 26 thereof is the reverse impelling force which causes the bodily shifting of the glass.

The reverse shifting of the body of glass within the flow conduit 25 is shortly terminated and is not allowed to be carried to completion. The flow conduit retains the major portion of the glass contained therein and is not emptied by this reversing action. In other words, a momentary reverse only of the glass is effected, resulting in a temporary suspension of glass flow in between the times of mold filling. The extent of the reverse flow may be varied for any given set of conditions by varying the cross-sectional area of the flow conduit, or by changing the size of the section 26 of the conduit to the extent of either lessening or increasing the mass of glass therein to thereby decrease or increase the reversing impulse by thus changing the weight of the mass. Further variation of the reverse impulse may be obtained by varying the time interval between successive gathers. The difference in elevation between the level at which the glass is sheared and the level of glass in the forehearth, together with the effective diameter or cross-sectional area of the flow conduit, and the size of portion 26 of the conduit, are the controlling factors which ordinarily determine the amount of reverse flow.

As the aforementioned reverse flow takes place, any chill that may have been imparted to the glass at the point of shear is moved back into the flow conduit where it is rendered plastic by the superheating of the conduit by furnace gas circulation or by radiation from the electrical heating elements 28. This retracted glass in the vicinity of the discharge opening is thus held in readiness and is the first to enter the next succeeding mold at the next successive charging operation.

After the parison forming unit 12 has moved clear of the charging zone and prior to arrival of the next succeeding unit at that zone, the adapter 33 is elevated out of contact with the parison body mold sections 31 as shown in Fig. 9 and is swung out of register therewith by any suitable mechanism (not shown). Upon arrival of the next succeeding parison forming unit, vacuum is applied to the cavity thereof, glass is withdrawn from the flow conduit 25, and the operation is repeated as for the preceding unit.

From the preceding description, it should be apparent that each mold 31 as it comes into register with the orifice 29 becomes an actual part of the conduit for transferring glass from the forehearth 17 but is a part that is necessarily removable and replaceable by a succeeding like part. Also, these removable parts 31 are the actuating means for moving the glass through the conduit 29 and without which there would be no movement of glass through said conduit in either direction.

All of the previous description has been confined to the idea of utilizing a single conduit 25 in the gathering of a single charge of glass but it is also contemplated that two or more charges may be gathered simultaneously by and through proper arrangement of multiple conduits. Therefore, in Fig. 2 there is shown one arrangement of multiple conduits 25 and 25ª each with individual temperature control elements 28 and in Fig. 3 there is shown a double cavitied mold in alignment with the multiple conduits. The operation of the multiple conduits and the multiple cavitied mold 45 is identical with that just previously described in connection with a single cavity mold and consequently any further description should be unnecessary.

Modifications may be resorted to within the spirit and scope of the appended claims.

I claim:

1. The method which comprises bringing an open end of a mold into sealing engagement with a downwardly opening discharge end of a conduit, the other end of which conduit is in sealing contact with a pool of molten glass, the surface of which is at a lower lever than said discharge end of the conduit, withdrawing the air from the mold cavity and thereby causing a flow of glass through the conduit to fill the mold cavity, severing the glass between said discharge end and the mold, and subjecting it to atmospheric pressure and thereby causing the head of glass over the sealed end of the conduit to produce a gravity movement of the glass in the reverse direction in the conduit.

2. The method which comprises bringing a series of molds periodically and in succession to a charging position in which an open end of the mold is in sealing engagement with a downwardly opening discharge end of a conduit, the other end of which conduit opens into a pool of molten glass, the level of the pool being below the plane of said discharge end, exhausting the air from each mold when the latter is in said sealing engagement with the conduit and thereby causing an outward flow of glass from the pool through the conduit into the mold, shearing the glass at said outlet by a movement of the mold laterally thereto, and inducing a reverse flow through the conduit by the unbalanced gravity pull on the glass at opposite ends of the conduit and by which reverse flow the glass is retracted from the conduit outlet, each succeeding mold being brought to filling position and the induction of glass thereinto established before the recession of glass in the conduit has extended back to the pool.

3. The method which comprises bringing a series of molds periodically and in succession to a charging position in which an open end of the mold is in sealing engagement with a downwardly opening discharge end of a conduit, the other end of which conduit opens into a pool of molten glass, the level of the pool being below the plane of said discharge end, exhausting the air from each mold when the latter is in said sealing engagement with the conduit and thereby causing an outward flow of glass from the pool through the conduit into the mold, shearing the glass at said outlet by a movement of the mold laterally thereto, and causing a reverse flow of glass by the unbalanced gravity pull on the glass at opposite ends of the conduit and by which reverse flow a recession of the glass from the outlet opening is produced each time a mold is moved away from said opening.

4. The method of obtaining mold charges of molten glass for a forming machine which consists in directing a flow of glass from a supply body through a passageway leading from the surface of the supply body, lowering glass by suction from said passageway into a mold of a forming machine, shearing a measured charge from the glass as lowered at a level below the surface level of said supply body, and thereafter raising the sheared end of the glass in said passageway by the action of gravity.

5. Glass feeding apparatus comprising, in combination, an enclosed forehearth to contain molten glass, a horizontally disposed conduit having downturned ends, one of said ends having an outlet opening at one side of the body of glass in the forehearth and above the normal level of the glass in the forehearth, the other end of said conduit extending into the glass within the forehearth, an inverted suction gathering mold movable into a position in which the mold cavity is in communication with said opening and forms a continuation of said conduit, means for exhausting air from the mold and thereby establishing a subatmospheric pressure which induces a flow of glass through the conduit into the mold, and means for severing a charge of glass in the mold from the glass in the conduit at a level above that of the glass in the forehearth and thereby causing a back-flow of glass in the conduit.

6. In a glass feeding device, the combination of a forehearth including a basin, molten glass in the basin, an inverted suction mold disposed outwardly beyond said basin and having its upper and lower ends positioned respectively above and below the level of the glass in said basin, a stationary conduit projecting outwardly from said basin and having its inner end disposed in the glass and its outer end in register with the upper end of said mold, means to apply suction to said mold and conduit to transfer molten glass from said forehearth to said mold, and means operable to move said mold alternately into and out of register with said conduit and subject the outer end of the conduit to atmospheric pressure while the mold is out of register therewith, and thereby induce a reverse flow of glass within the conduit.

7. In a glass feeding device, the combination of a basin, molten glass therein, a horizontally disposed conduit extending outwardly beyond said basin and having its end portions turned downward, the outer and inner ends being respectively above and below the level of glass in said basin, means to cause periodic outward movements of glass through said conduit, alternating with inward movements induced by gravity, and means to regulate and vary the temperature of the glass in its passage through said conduit.

8. The method of causing a periodic intermittent flow of molten glass outwardly from a pool of molten glass through a conduit having its inner end in sealing contact with the glass in the pool and its outer end opening downwardly at a level above the surface level of the pool, which method comprises intermittently subjecting the outer end of the conduit alternately to suction and atmospheric pressure and thereby causing intermittent outward movements of glass through the conduit when suction is applied and reverse movements of glass within the conduit by the action of gravity on the glass in the conduit when said atmospheric pressure is applied, said reverse movements being in alternation with said outward flow, and arresting each said reverse movement while the major portion of the conduit is still filled with molten glass.

9. Apparatus for molding glass articles comprising in combination a container for a pool of molten glass, a mold carriage, an annular series of pairs of molds thereon, said carriage rotatable intermittently to bring said pairs of molds in succession to a charging station adjacent said container, a pair of conduits each having an inner end in sealing contact with the pool of glass in the container, and a discharge end opening downwardly at said station, each said pair of molds having their upper ends open and brought into register with said discharge ends of the conduits at said station, said discharge ends of the conduits and said upper ends of the molds while in register therewith being above the normal level of the pool and the major portion of the molds and mold cavities below the normal level of the pool, means for exhausting the air from the molds and thereby causing a flow of molten glass through the conduits into the molds augmented by the force of gravity, and means for severing the glass at said discharge ends of the conduits and causing a gravitational back-flow of glass in the conduits.

10. The method of obtaining measured charges of glass from a pool of molten glass which consists in producing a subatmospheric pressure within a confined space extending above and below the level of the pool and in communication with the glass in the pool through a conduit opening into said space at a level above that of the pool and thereby subjecting the glass in the conduit to subatmospheric pressure and establishing a flow of glass into said confined space and collecting a measured charge of the glass in said space, severing the charge at a level above the surface level of the pool, and at the area of said severance admitting atmospheric pressure to the glass from which charge has been severed and through the action of gravity reversing the direction of glass flow after said severance.

LEONARD D. SOUBIER.